US009275422B2

(12) United States Patent
Aksu et al.

(10) Patent No.: US 9,275,422 B2
(45) Date of Patent: Mar. 1, 2016

(54) DISTRIBUTED K-CORE VIEW MATERIALIZATION AND MAINTENANCE FOR GRAPHS

(71) Applicant: International Business Machines Corporation, Armonk, NY (US)

(72) Inventors: Hidayet Aksu, Thornwood, NY (US); Mustafa Canim, Ossining, NY (US); Yuan-Chi Chang, Armonk, NY (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 13/904,633

(22) Filed: May 29, 2013

(65) Prior Publication Data

US 2014/0354649 A1    Dec. 4, 2014

(51) Int. Cl.
G06T 11/20 (2006.01)
G06Q 50/00 (2012.01)
G06K 9/00 (2006.01)
G06F 17/30 (2006.01)

(52) U.S. Cl.
CPC .......... G06Q 50/01 (2013.01); G06K 9/00 (2013.01); G06F 17/30 (2013.01)

(58) Field of Classification Search
None
See application file for complete search history.

(56) References Cited

U.S. PATENT DOCUMENTS

| 6,535,872 | B1 | 3/2003 | Castelli et al. | |
|---|---|---|---|---|
| 6,867,788 | B1 | 3/2005 | Takeda | |
| 2006/0015588 | A1* | 1/2006 | Achlioptas et al. | 709/220 |
| 2009/0177697 | A1 | 7/2009 | Gao et al. | |

OTHER PUBLICATIONS

"k-Cores," In: "Degeneracy (graph theory)", Wikipedia Foundation, Inc., dated Jan. 20, 2013, 6 pages. Accessed May 30, 2013, http://en.wikipedia.org/wiki/Degeneracy_(graph_theory)#k-Cores.
Batagelj et al., "Fast algorithms for determining (generalized) core groups in social networks", Advances in Data Analysis and Classification, vol. 5, No. 2, Jul. 2011, pp. 129-145.
Batagelj et al., "An O(m) Algorithm for Cores Decomposition of Networks", Computing Research Repository (CoRR), arXiv:cs/0310049v1 [cs.DS], Oct. 2003, 10 pages.
Cheng et al., "Efficient Core Decomposition in Massive Networks", Proceedings of the 2011 IEEE 27th International Conference on Data Engineering (ICDE '11), Apr. 2011, pp. 51-62.
Cooper, "The cores of random hypergraphs with a given degree sequence", Random Structures & Algorithms, vol. 25, No. 4, Dec. 2004, pp. 353-375.

(Continued)

*Primary Examiner* — Ryan R Yang
(74) *Attorney, Agent, or Firm* — Yee & Associates, P.C.; Nidhi Garg

(57) ABSTRACT

Large graph data in many application domains dynamically changes with vertices and edges inserted and deleted over time. The problem of identifying and maintaining densely connected regions in the graph thus becomes a challenge. Embodiments of the invention describe a method using a k-core measure as a metric of dense connectivity over large, partitioned graph data stored in multiple computing servers in a cluster. The method describes steps to identify a k-core subgraph in parallel and to maintain a k-core subgraph when a new edge is inserted or an existing edge is deleted. The embodiments thus enable practitioners to identify and monitor large scale graph data, such as exemplified by multiple topical communities in a social network, in a scalable and efficient manner.

17 Claims, 11 Drawing Sheets

(56) References Cited

OTHER PUBLICATIONS

Janson et al., "A simple solution to the k-core problem", Random Structures and Algorithms, vol. 30, No. 1-2, Jan.-Mar. 2007, pp. 50-62.

Li et al., "Efficient Core Maintenance in Large Dynamic Graphs", Computing Research Repository (CoRR), arXiv:1207.4567 [cs.DS], Jul. 2012, 15 pages.

Luczak, "Size and connectivity of the k-core of a random graph", Discrete Mathematics, vol. 91, No. 1, Aug. 1991, pp. 61-68.

Miorandi et al., "K-shell Decomposition for Dynamic Complex Networks", Proceedings of the 8th International Symposium on Modeling and Optimization in Mobile, Ad Hoc, and Wireless Networks (WiOpt 2010) International Workshop on Dynamic Networks (WDN 2010), Jun. 2010, pp. 499-507.

Molloy, "Cores in random hypergraphs and Boolean formulas", Random Structures & Algorithms, vol. 27, No. 1, Aug. 2005, pp. 124-135.

Montresor et al., "Brief Announcement: Distributed k-Core Decomposition", Proceedings of the 30th Annual ACM SIGACT-SIGOPS Symposium on Principles of Distributed Computing (PODC '11), Jun. 2011, pp. 207-208.

Pittel et al., "Sudden Emergence of a Gian k-Core in a Random Graph", Journal of Combinational Theory, Series B, vol. 67, No. 1, May 1996, pp. 111-151.

Seidman, "Network structure and minimum degree", Social Networks, vol. 5, No. 3, Sep. 1983, pp. 269-287.

\* cited by examiner

DISTRIBUTED K-CORE VIEW MATERIALIZATION AND MAINTENANCE FOR GRAPHS

This invention was made with Government support under Contract No.: W911NF-11-C-0200 (Defense Advanced Research Projects Agency (DARPA)). The Government has certain rights in this invention.

BACKGROUND

1. Field

The present invention relates generally to analytical techniques, and more particularly to analytical techniques for identifying a k-core subgraph in a graph and maintaining the materialized k-core subgraph over dynamic updates to the graph, usefully with data stored in a distributed cluster.

2. Description of the Related Art

Large scale graph data is widely represented in problems in scientific and engineering disciplines. For example, the problems of identifying k-core subgraphs appear in the context of finding close-knit communities in a social network, analyzing protein interactions, understanding the nucleus of Internet Autonomous Systems, and the like. In graph theory, k-core is a key metric used to identify subgraphs of high cohesion, also known as the "dense" regions of a graph. The k-core metric is defined as the maximal connected subgraph in which all vertices have degree at least k (Reference: http://en.wikipedia.org/wiki/Degeneracy_(graph_theory)#k-Cores) Equivalently, the k-core subgraph can be found by repeatedly deleting from the complete original graph all vertices of degree less than k.

Previously, Batagelj and Zaversnik (BZ) proposed a linear time algorithm to compute k-core (Reference: Vladimir Batagelj and Matjaz Zaversnik. An O(m) Algorithm for Cores Decomposition of Networks, Advances in Data Analysis and Classification, 2011. Volume 5, Number 2, 129-145). The BZ algorithm first sorts the vertices in the increasing order of degrees and starts deleting the vertices with degree less than k. At each iteration, the algorithm sorts the vertices by their degrees to keep them ordered. Due to high number of random accesses to the graph, the algorithm can run efficiently only when the entire graph can fit into main memory of a single machine.

In order to go beyond the limit of main memory, Cheng et al. proposed an external-memory algorithm, which can spill into disk when the graph is too large to fit into main memory (Reference: J. Cheng, Y. Ke, S. Chu, and M. T. Özsu, "Efficient core decomposition in massive networks," in ICDE, 2011, pp. 51-62). This proposed algorithm, however, does not consider any distributed scenario where the graph resides on a large cluster of machines.

In addition to computing k-core, another challenge is to maintain the k-core subgraph, as successive edge insertions and/or deletions occur. Li et al. addressed dynamic updates by determining a minimal region in the graph impacted by updates (Reference: R. Li and J. Yu, "Efficient core maintenance in large dynamic graphs," arXiv preprint arXiv: 1207.4567, 2012). The proposed Li et al. algorithm however only works for in-memory on a single server only.

SUMMARY

The current invention overcomes data volume scalability limitation by employing a distributed server cluster with graph data partitioned and stored on persistent storage. It further describes techniques to maintain a k-core subgraph over dynamically changing graph data in the presence of edge insertion and deletion.

One embodiment of the invention provides a method for determining a k-core subgraph over graph data, wherein graph data representing the topological structure of interactions among vertices is partitioned and stored across multiple servers in a cluster. The method includes steps executed in parallel on the computing cluster to first determine the portion of graph data that is eligible for the k-core, based on the degree of respective vertices, to then iteratively delete vertices with less than k degrees from the remaining vertices, and to terminate the iteration when no more vertices are deleted.

A further embodiment of the invention pertains to a method for maintaining a k-core subgraph over graph data, wherein graph data representing the topological structure of interactions among vertices is partitioned and stored across multiple servers in a cluster. The method includes steps executed in parallel on the computing cluster to first update auxiliary information about newly inserted or deleted edge data, and to then determine based on qualifying conditions if the update changes the current k-core subgraph. The method then proceeds to traverse the graph data, if needed, to identify additional vertices that may be qualified for k-core and to iteratively identify additional k-core edges from qualified vertices.

Yet another embodiment is directed to a method associated with specified graph data comprising vertices, and edges that each extends between two vertices. The method comprises, for a given value k, iteratively selecting each vertex from the specified graph data that has a degree which is equal to or greater than k. The method further comprises determining whether a qualifying neighbor count (QNC) of each selected vertex is equal to or greater than k. Any edge incident at a vertex that has a QNC which is not equal to or greater than k is deleted. The iterations are terminated when no more edges are deleted, and the remaining undeleted graph data is designated to be a particular k-core subgraph.

DETAILED DESCRIPTION

Figure 1:
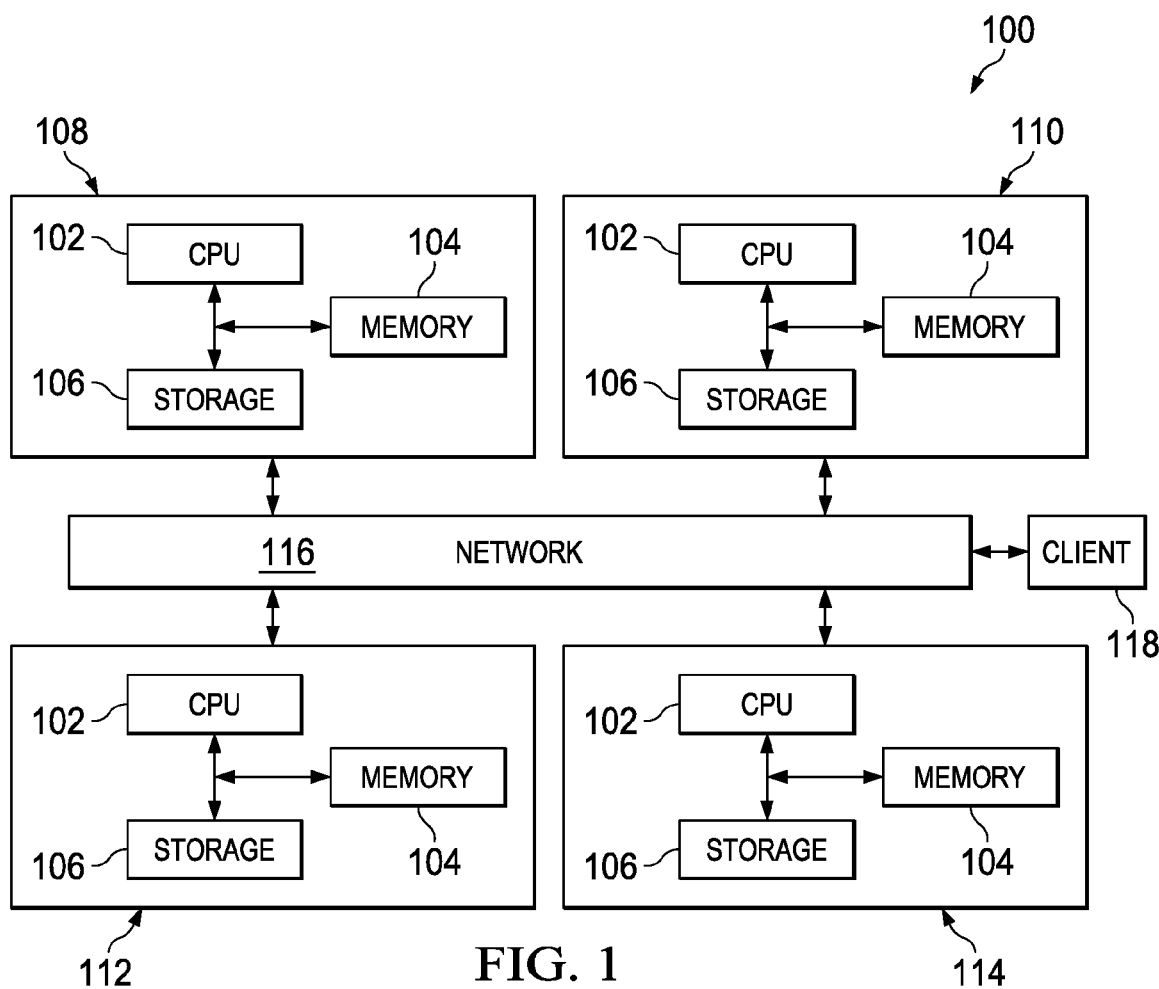
FIG. 1 is a block diagram showing a distributed data processing system for executing methods according to an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention relates generally to analytical techniques for identifying a k-core subgraph in a graph and maintaining the materialized k-core subgraph over dynamic updates to the graph.

According to an exemplary embodiment of the present invention, the analytical technique employs a cluster of computing servers, each of which stores and manages a partitioned set of nodes or vertices and edges in the graph. The technique can be considered to have data volume scalability over the cluster of computing servers. The analytical technique can include a parallel processing method including the distributed construction and maintenance of a k-core subgraph among the computing servers. Messages can be exchanged among the computing servers asynchronously as the local findings converge to a result. The computing servers each include a processor, a memory, and a persistent storage space where the partitioned graph data can be stored.

According to an exemplary embodiment of the present invention, large scale graph data can be processed. The graph data represents a topology of the distributed network of nodes. The large scale graph data is partitioned and stored on multiple disks.

According to an exemplary embodiment of the present invention, a processing of the partitioned graph data can be distributed across multiple computing servers in parallel. The computing servers can have local access to the partitioned graph data and can exchange messages with one another.

Referring to FIG. 1, there is shown an exemplary distributed data processing system 100 that includes one or more servers such as servers 108-114, interconnected via a network 116. The servers 108-114 collectively comprise a cluster of computing servers for implementing an exemplary embodiment of the invention. The embodiment relates generally to analytical techniques for identifying a k-core subgraph as described above, in a graph of vertices or nodes and edges, and maintaining the materialized k-core subgraph over dynamic events that update or change the graph. The cluster of computing servers 108-114 each stores and manages a partitioned set of vertices and edges of the graph. The technique may be considered to have data volume scalability over the cluster of computing servers. The analytical technique can also use a parallel processing method that includes the distributed construction and maintenance of a k-core subgraph among the computing servers. Messages can be exchanged among the computing servers asynchronously, as the local findings converge to a result. As described hereinafter in further detail, the computing servers each include a persistent storage space, where the partitioned graph data for that server can be stored.

Moreover, in an exemplary embodiment of the invention, large scale graph data can be processed. The graph data represents a topology of the distributed network of nodes or vertices, and the large scale graph data is partitioned and stored on multiple disks or other persistent storage media of respective servers. Also, a processing of the partitioned graph data can be distributed across multiple computing servers in parallel, and the computing servers can have local access to the partitioned data.

Large scale graph data, as used herein, can refer to a body of graph data that includes on the order of 1,000,000 vertices or nodes, and 10,000,000 edges. However, it is to be emphasized that such values are provided only for purposes of illustration, and embodiments of the invention are by no means limited thereto.

Referring further to FIG. 1, there is shown each server of the distributed data processing system 100 provided with one or more processors 102 (e.g., central processing units (CPUs)), a memory 104 and a storage device 106. Code or instructions implementing processes of exemplary embodiments can be stored in a memory 104 and executed by a processor 102. Storage devices 106 can store the instructions, as well as graph data, to be processed by the system. The graph data can be selectively partitioned and stored, across distributed servers of the system 100.

FIG. 1 further shows a client 118 connected to respective servers 108-114 of system 100 through network 116. Client 118 may be operated to interact with the servers to initially define or construct a k-core subgraph $G_k$ from the graph data, and to subsequently modify the k-core subgraph by adding or deleting graph edges.

Figure 2:
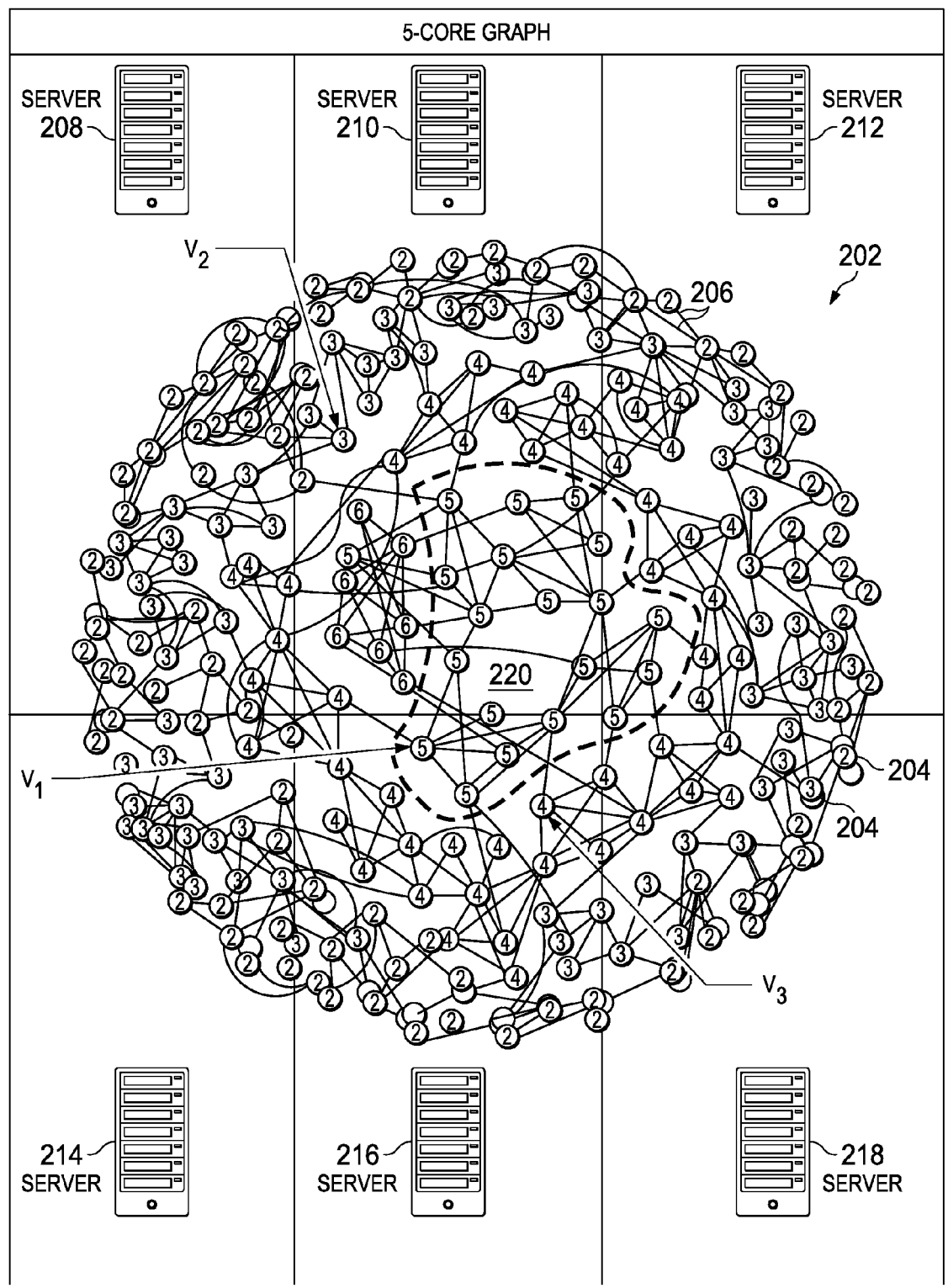
FIG. 2 depicts a k-core subgraph on very large graph data partitioned and managed by a cluster of computing servers.

Referring to FIG. 2, there is shown a graph G comprising graph data 202, which may be large scale graph data as described above. The graph data includes a large number of vertices, exemplified by vertices 204, and edges that respectively extend between two vertices. These edges are exemplified by edges 206. By way of example, graph data 202 of the graph G could pertain to communities in a social network, or data for analyzing protein interactions, but embodiments of the invention are by no means limited thereto.

FIG. 2 further shows each of the vertices of the graph data displaying a number. The number of a given vertex denotes the maximum value of k, for a k-core subgraph that the given vertex is entitled to belong to. For example, the vertex $V_1$ shows the number 5, and belongs to k-core subgraph 220. In order to belong to the 5-core subgraph, a vertex must be connected by edges to at least 5 other vertices that each qualifies for the 5-core level.

In view of the above, it is to be understood that each vertex of the graph data 202 has two important associated parameters. In accordance with embodiments of the invention, these parameters are used to construct a k-core subgraph from the graph data 202 with high efficiency, for a specified value of k. One of the parameters is the degree of a given vertex, which denotes the number of neighboring vertices the given vertex is connected to by respective edges. The other parameter of a given vertex is its qualifying neighbor count (QNC). For a specified value of k, the QNC value of a given vertex is the number of neighboring vertices connected to the given vertex that each has a degree which is equal to or greater than the k value.

Referring further to FIG. 2, there is shown a cluster of servers 208-218, which may be included in a distributed data processing system such as system 100 described above. FIG. 2 also shows graph data 202 of graph G provided with horizontal and vertical lines. These lines partition or divide graph data 202 into partitioned sets, with one of the partitioned sets associated with each of the servers 208-218. Usefully, each of the servers stores and manages its associated partitioned set. Thus, the partitioned graph data is distributed across multiple computing servers and can be processed in parallel as described above. This provides data volume scalability, as likewise described above.

In some embodiments of the invention, a k-core subgraph such as subgraph 220 may also be partitioned, with one subgraph partition being stored on each of the computing servers, and kept separate from the original graph G data. In other embodiments, the k-core subgraphs could be stored on only some of the servers, or even on just one server. This could be useful, for example, if the data set of the k-core subgraph was quite small, in comparison with the size of the original graph G.

Figures 3A, 3B:
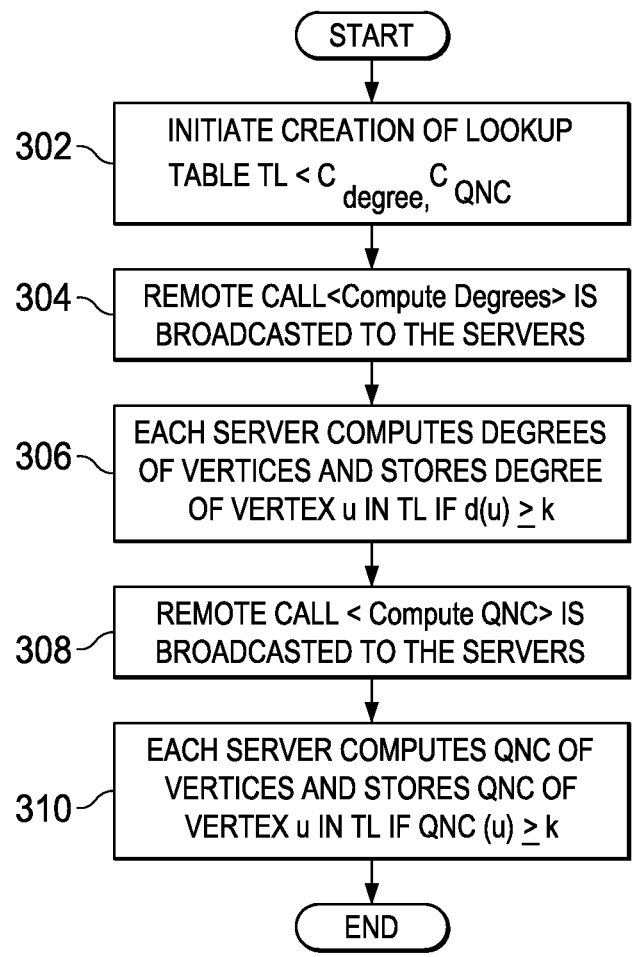
FIG. 3A is a flowchart or flow diagram illustrating steps to create a look up table TL which keeps the degrees and QNC values of respective graph nodes or vertices.
FIG. 3B Is a schematic representation of a look up table created in accordance with FIG. 3A.

Referring to FIG. 3A, there are shown steps for creating a Lookup Table TL, such as a Lookup Table 300 which is schematically represented in FIG. 3B. As described hereinafter in further detail, embodiments of the invention generate a truncated or pruned k-core subgraph $G_k$ for a specified value of k, from graph data such as graph data 202 of original Graph G. In accordance with these embodiments, it has been recognized that the pruned k-core subgraph provides a very useful tool or mechanism for graph maintenance, as subsequent additions and deletions are made to the graph data. Creation of the Lookup Table is a very useful preliminary step in constructing a pruned k-core subgraph.

At step 302 of FIG. 3A, creation of a Lookup Table ($C_{degree}$, $C_{QNC}$) is initiated by a client 118 or the like. The Lookup Table is intended to contain the degree and QNC value of each vertex that is to be included in the k-core subgraph, which has a particular specified value of k. In a distributed processing system such as system 100, a component of the Lookup Table could be located at each server of the system, to receive data to be processed by that server. Alternatively, the Lookup Table could be centrally located in the system.

At step 304, the client broadcasts a remote function call (Compute Degrees) to all the servers of the distributed processing system 100. This call causes the servers to scan their respective partitioned sets or regions of graph data at step 306, and to count the degree of each vertex included in such data.

The degree of a vertex is then inserted into the Lookup Table TL for storage, if the degree is equal to or greater than the specified value of k.

At step 308, the client broadcasts a remote function call (Compute QNC), to all the servers of the distributed processing system 100. This call causes the servers to scan their respective partitioned sets of graph data at step 310, and compute the QNC value of each vertex included in such data. The QNC value of a vertex is then inserted into Lookup Table TL for storage, if the QNC value is equal to or greater than the specified value of k.

Referring to FIG. 3B, there is shown Lookup Table 300, which stores vertices selected from graph data 202 by the process of FIG. 3A, as described above. More particularly, Lookup Table 300 stores vertices that are selected for k-core subgraph 220, which has a k value of 5.

Vertex $V_1$ of graph data 202, as shown by FIG. 2, is connected to 6 neighbors. Vertex $V_1$ thus has a degree of 6, which is equal to or greater than the k value of subgraph 220, which is 5. Of the 6 neighbors, 5 of them have degrees that are each at least equal to 5. The QNC value of vertex $V_1$ is therefore 5. Accordingly, vertex $V_1$ meets the qualifications for listing in Lookup Table 300, as set forth by the procedure of FIG. 3A.

On the other hand, vertex $V_2$ of the graph data 202 has only a degree of 4, and therefore cannot be included in the Lookup Table 300 for 5-core subgraph 220. Vertex $V_3$ has 5 connections and thus has a degree of 5. However, vertex $V_3$ does not have at least 5 neighbors that each has a degree of 5 or more. Vertex $V_3$ therefore also cannot be included in Lookup Table 300.

It may be seen from FIGS. 3A and 3B and the description thereof that the two parameters described above, i.e. degree of a vertex and QNC of a vertex, can be used very effectively to filter out vertices which do not belong to a searched k-core subgraph, for a particular value of k.

Figure 4:
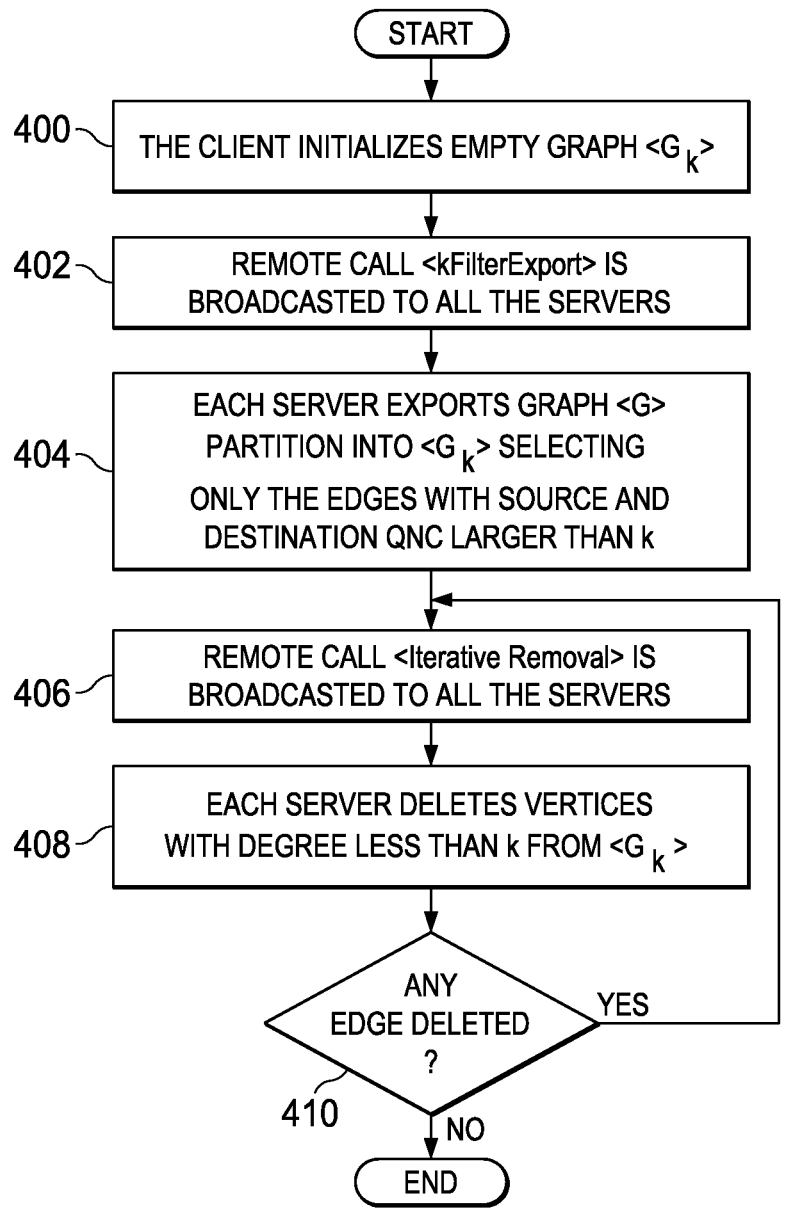
FIG. 4 is a flow diagram illustrating how the k-core subgraph is exported as a subgraph, and is pruned or filtered based on degree and QNC values.

At step 400 of FIG. 4, the client initializes an empty graph table $G_k$, which will be used to store a final pruned k-core subgraph $G_k$. The client then broadcasts a remote function call (k filterExport) to all of the servers, at step 402. This causes each server to scan its partitioned data set, to detect each edge (u,v) therein that has QNC values for u and v that are equal to or greater than k. It is anticipated that this detection effort will be significantly reduced for the servers by using information already stored in a Lookup Table for the k-core subgraph, as described above in connection with FIGS. 3A and 3B. Each edge detected in a scanned partition is then exported to the subgraph $G_k$, at step 404.

At step 406, the client initiates another remote function call (Iterative Removal) to the servers. This causes each of the servers to scan its partitioned data set at step 408, and to delete each vertex from $G_k$ that is found to have a degree of less than k.

Decision step 410 queries whether any edge has been deleted from subgraph $G_k$ as a result of the remote call at step 406. If the query is affirmative, the procedure of FIG. 4 returns to step 406, to determine whether there are any further edges to be deleted. Otherwise the procedure of FIG. 4 ends, and the pruned k-core subgraph is completed.

In another approach to creating the k-core subgraph $G_k$, referred to as the Basic Version, each server scans its own partitioned data, and deletes edges incident to vertices that have degrees of less than k. It is anticipated that for a number of situations, such as for large values of k, the early pruning technique as described above in FIG. 4 will enable a k-core subgraph to be constructed with significantly less effort than by using the basic version approach.

Figure 5:
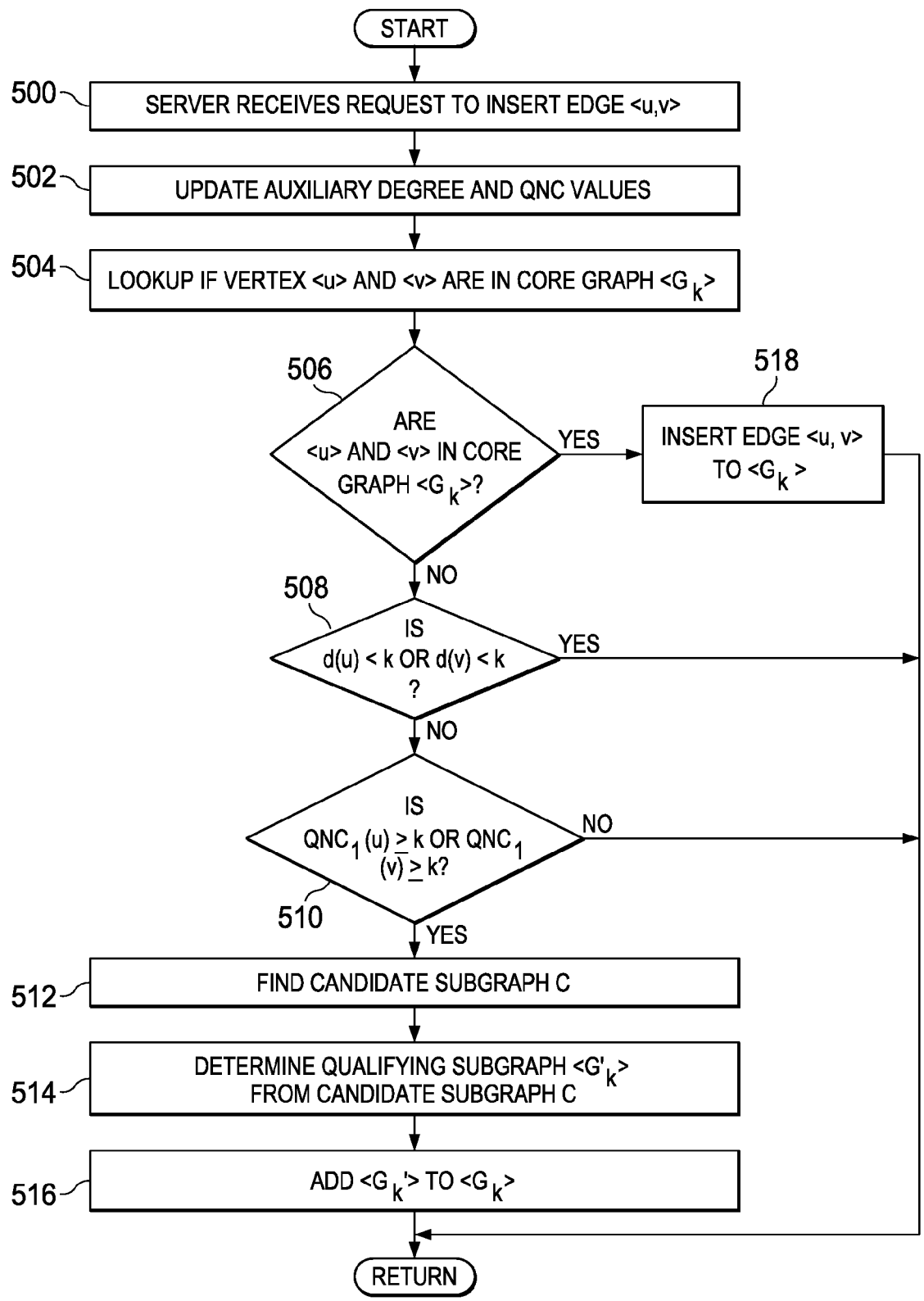
FIG. 5 is a flow diagram illustrating maintenance steps for a k-core subgraph in the event of an edge insertion.

Referring to FIG. 5, there is shown a flowchart depicting steps of a procedure comprising an algorithm that commences when one of the servers of the distributed processing system receives a request to insert an edge (u, v) into the data of graph G. This occurs at step 500, and may happen at any time. In response, the server updates the Lookup Table described above at step 502, to include the respective degrees and QNC values of each newly received vertex u and v.

At step 504, the server must determine from the Lookup Table whether or not both the source vertex u and the destination vertex v are in the k-core subgraph $G_k$. This query is implemented at decision step 506, and if the decision is affirmative, the procedure of FIG. 5 goes to step 518. At this step the server inserts edge (u, v), into the k-core subgraph $G_k$ and returns, whereupon the procedure of FIG. 5 ends.

If the decision at step 506 is negative, the procedure moves to decision step 508, and the server determines if either the degree of u or the degree of v is less than the k-core value k. If this determination is affirmative the procedure ends, and otherwise goes to decision step 510. At this step it is determined whether or not at least one of the vertices u and v has a QNC value that is equal to or greater than k. If not, the procedure ends. However, if the decision at step 510 is affirmative, the procedure of FIG. 5 goes on to step 512.

Step 512 looks for possible additional graph data elements for the k-core subgraph, starting with the vertex u. These elements are placed into a candidate subgraph C, which is returned by the server. Step 512 is described hereinafter in further detail, in connection with FIG. 6.

Step 512 is followed by step 514, wherein the server determines whether any of the data elements in the candidate subgraph C qualifies for inclusion in a qualifying subgraph $G'_k$. Step 514 is described hereinafter in further detail, in connection with FIG. 7.

At step 516 the server adds all the qualifying data elements of subgraph $G'_k$ to k-core subgraph $G_k$, and then returns. This ends the procedure of FIG. 5.

It is to be emphasize that the pruned k-core subgraph $G_k$, and information contained in Lookup Table 300 as described above, can be used very effectively in carrying out respective comparison steps and other steps of the procedure of FIG. 5.

Figure 6:
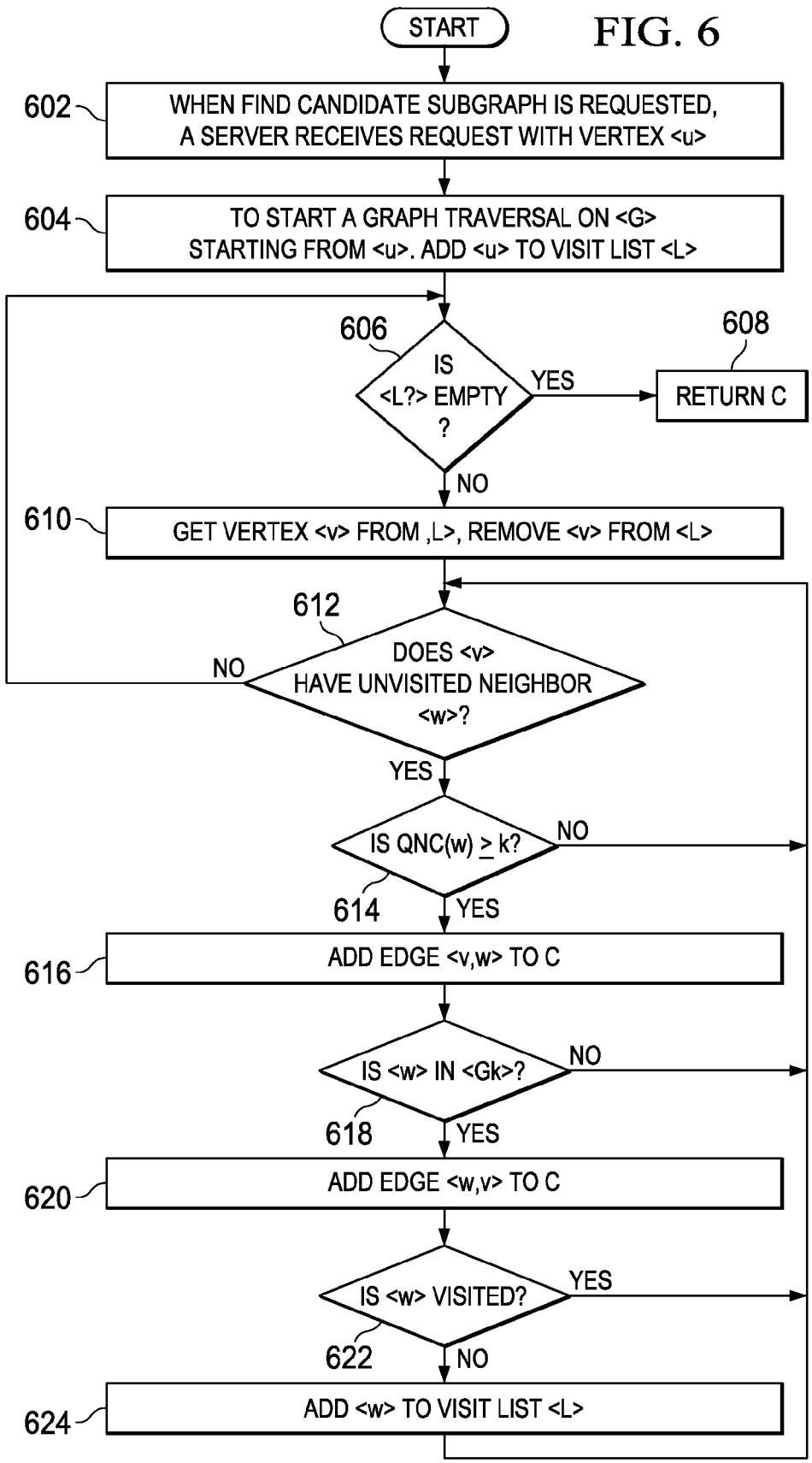
FIG. 6 illustrates a procedure which may be used in the procedure of FIG. 5 to find a candidate subgraph that contains possible edges that may need to be inserted into the k-core subgraph after an edge insertion.

Referring to FIG. 6, there are shown steps of a procedure comprising an algorithm for determining whether respective edges (u,v) associated with an edge insertion, as described above in connection with FIG. 5, should be included in the candidate subgraph C. The procedure of FIG. 6 is carried out by a server of the distributed processing system, and begins at step 602 when the server receives a request to find a candidate subgraph C, starting from vertex u. Responsive to the request, the server commences a traversal of its partitioned set of the data of graph G at step 604, starting from the source vertex u. Vertex u is added to a vertex visit list (L).

At decision step 606, the vertex visit list (L) is queried, to determine whether or not the list is empty. If it is, there are no further vertices to which the procedure of FIG. 6 must be applied. Accordingly, the current subgraph C is returned at step 608, and the procedure ends. However, if the visit list (L) is not empty at step 606, a vertex v is selected from the list at step 610, and is then removed from the visit list (L). The vertex could be a destination vertex or other neighbor of the vertex u. The procedure then goes to decision step 612.

Step 612 is provided to determine whether vertex v has any neighboring vertices w that have not been visited, that is, have not yet been examined or checked by the procedure of FIG. 6. If there are no such neighbors, the server returns to step 606, and the next neighbor on the list is considered. However, if there is an unvisited neighbor w, the QNC value of that neighbor is compared with the value of k at step 614.

If it is determined at step 614 that the QNC value of w is not greater than or equal to k, the server considers the next neighbor at step 612. However, if the QNC of w is greater than or equal to k, the procedure of FIG. 6 goes to step 616, which adds the edge (v,w) to the candidate subgraph C. Thus, steps 614 and 616 function effectively as a filter of neighboring vertices, to distinguish between respective vertices that should, and should not be included in the candidate subgraph. At the decision step 618 the server determines whether the vertex w resides in the k-core subgraphs $G_k$. If not, the server moves to consider the next neighbor vertex at step 612.

If the vertex w is found at step 618 to reside in subgraph $G_k$, the edge (w, v), is added to candidate subgraph C at step 620. As a result, it becomes necessary to check or visit the neighbors of vertex w. Accordingly, at decision step 622 the server determines whether or not neighbors of w have already been visited by graph traversal. If they have been visited, the server considers the next neighbor vertex at step 612. However, if neighbors of vertex w have not yet been visited, w is added to the visit list L at step 624. The server then moves to the next neighbor vertex at step 612.

The procedure of FIG. 6 ends once the list k is found to be empty at step 606, and the requested candidate subgraph C is finally returned at step 608.

Figure 7:
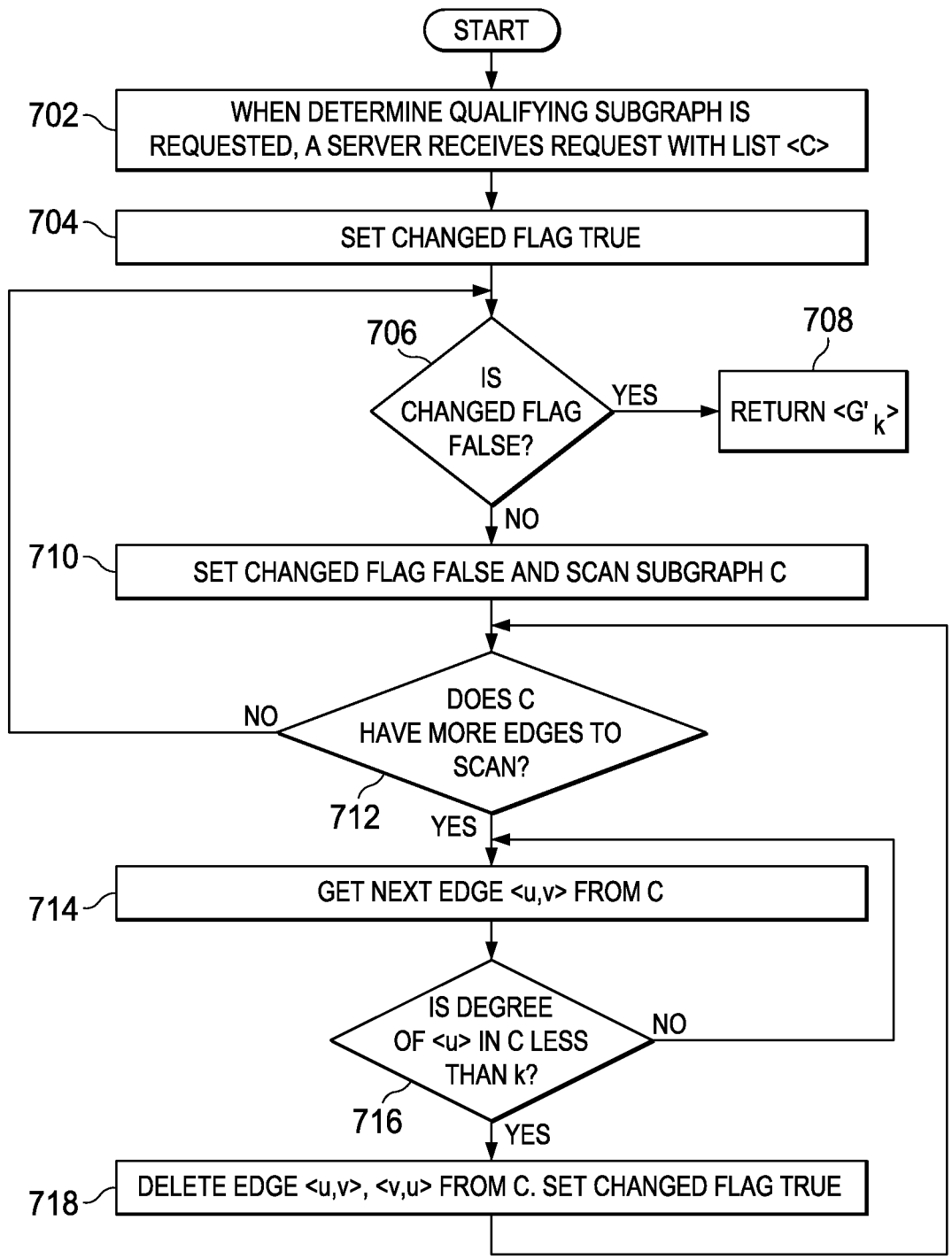
FIG. 7 illustrates a procedure which may be used in the procedure of FIG. 5 to find a set of edges from the candidate subgraph of FIG. 6 that qualify for insertion into the k-core subgraph after edge insertion.

Referring to FIG. 7, there are shown steps of a procedure comprising an algorithm for determining whether respective edges included in candidate subgraph C qualify for acceptance into the qualifying k-core subgraph $G'_k$, referred to above. Candidate subgraph C is also referred to as graph edge list C. The procedure of FIG. 7 filters out unqualified edges by detecting edge vertices which have degrees that are less than k.

The procedure of FIG. 7 is carried out by a server of the distributed processing system, and starts at step 702 when the server receives a request to determine a qualifying subgraph $G'_k$, from the candidate subgraph C. The request is accompanied by the candidate subgraph or edge list C. In response to the request, the server sets the changed flag to true at step 704.

Decision step 706 determines whether the changed flag is true or false. If the changed flag is false, the qualifying subgraph $G'_k$ has been determined, and is returned by the server. The procedure of FIG. 7 then ends. However, if the changed flag is found to be true at step 706, it is set to false at step 710, and the server commences a scan of respective edges over the candidate subgraph C. At decision step 712 the server determines whether or not any further edges remain to be scanned, for that particular scan. If not, the server moves to step 706, to determine if any further iterations are necessary as indicated by the changed flag.

If there are more edges to be scanned, the server reads the next such edge (u,v) from subgraph C at step 714. Then, at decision step 716 the server compares the degree of the source vertex u with the value of k. If the degree of source vertex u is not less than k, the server moves to step 714 to process the next edge of subgraph C in the scan. However, if source vertex u is less than k, the server deletes both edge (u,v) and the reverse edge (v,u) from the subgraph C at step 718. The server also sets the changed flag to true.

By providing the respective steps as arranged in FIG. 7, each edge of the candidate subgraph C will be iteratively processed, to ensure that only qualified edges will remain in the qualifying subgraph $G'_k$, which is returned at step 708.

Figure 8:
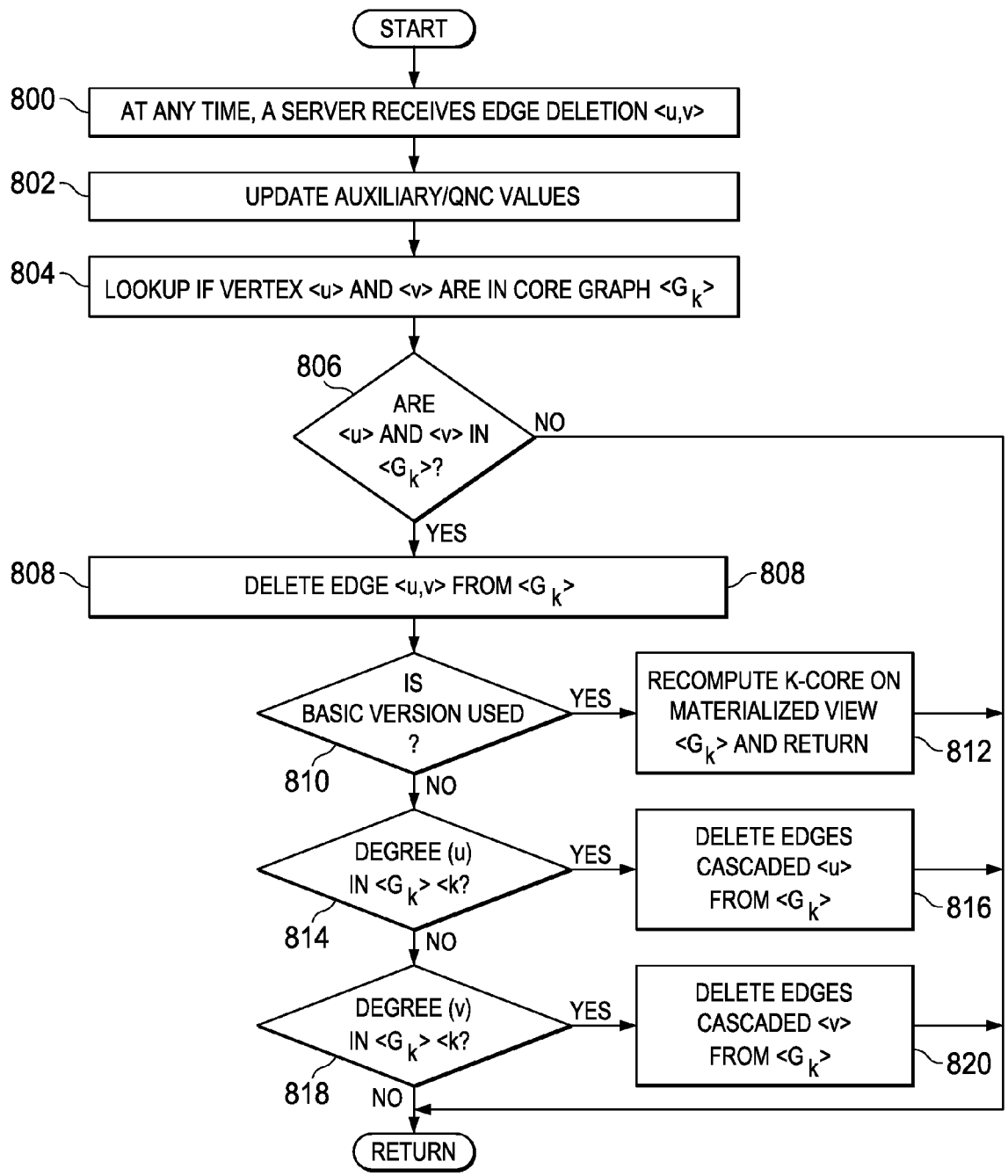
FIG. 8 is a flow diagram illustrating maintenance steps for a k-core subgraph in the event of an edge deletion.

Referring to FIG. 8, there is shown a flowchart depicting steps of a procedure comprising an algorithm, which commences at step 800 when one of the servers of the distributed processing system receives a request to delete an edge (u,v) from the data of graph G. A request of this type could be received at any time. In response, the server updates the Lookup Table at step 802, to remove any degree and QNC information affected by the deletion.

At step 804, the server must determine whether or not both the source vertex u and the destination vertex v are in the k-core subgraph $G_k$. This query is implemented at decision step 806. If they are not both in subgraph $G_k$, no change is required, and the algorithm of FIG. 8 returns. However, if it is determined at step 806 that both vertices u and v are in subgraph $G_k$, the edge (u,v) is deleted from the subgraph at step 808. The algorithm then goes to decision step 810.

As described above, two alternative approaches could be available for constructing the k-core subgraph $G_k$, one being the early pruning algorithm, and the other being the basic version approach. Accordingly, step 810 is provided to determine which of these approaches is running. If the basic version is being used, the procedure of FIG. 8 goes to step 812, and the server recomputes the k-core subgraph $G_k$ in accordance with that approach, in view of the deleted edge (u,v). The server then returns.

If it is determined at step 810 that the early pruning algorithm is running, the server must find out if deletion of the edge (u,v) has affected any neighbors in the $G_k$ subgraph of either the source vertex u or the destination vertex v. To accomplish this, the server checks the degree of both vertices u and v.

More particularly, at decision step 814, the server determines whether the degree of source u is less than the value of k. If not, the server moves to decision step 818, but otherwise proceeds to step 816. At this step the server makes a Delete Edges Cascaded request, starting from source u over the k-core subgraph $G_k$. The requested task is an analysis described hereinafter in further detail, in connection with FIG. 9.

Following step 816 the server moves to step 818, where the server decides whether the degree of destination vertex v is less than the value of k. If not, the server returns and the procedure of FIG. 8 ends. However, if vertex v is found to be less than k, the server moves to step 820 and makes a Delete Edges Cascaded request. This request, in like manner with step 816, is for an analysis starting from destination vertex v over the k-core subgraph $G_k$. The server returns following step 820.

Figure 9:
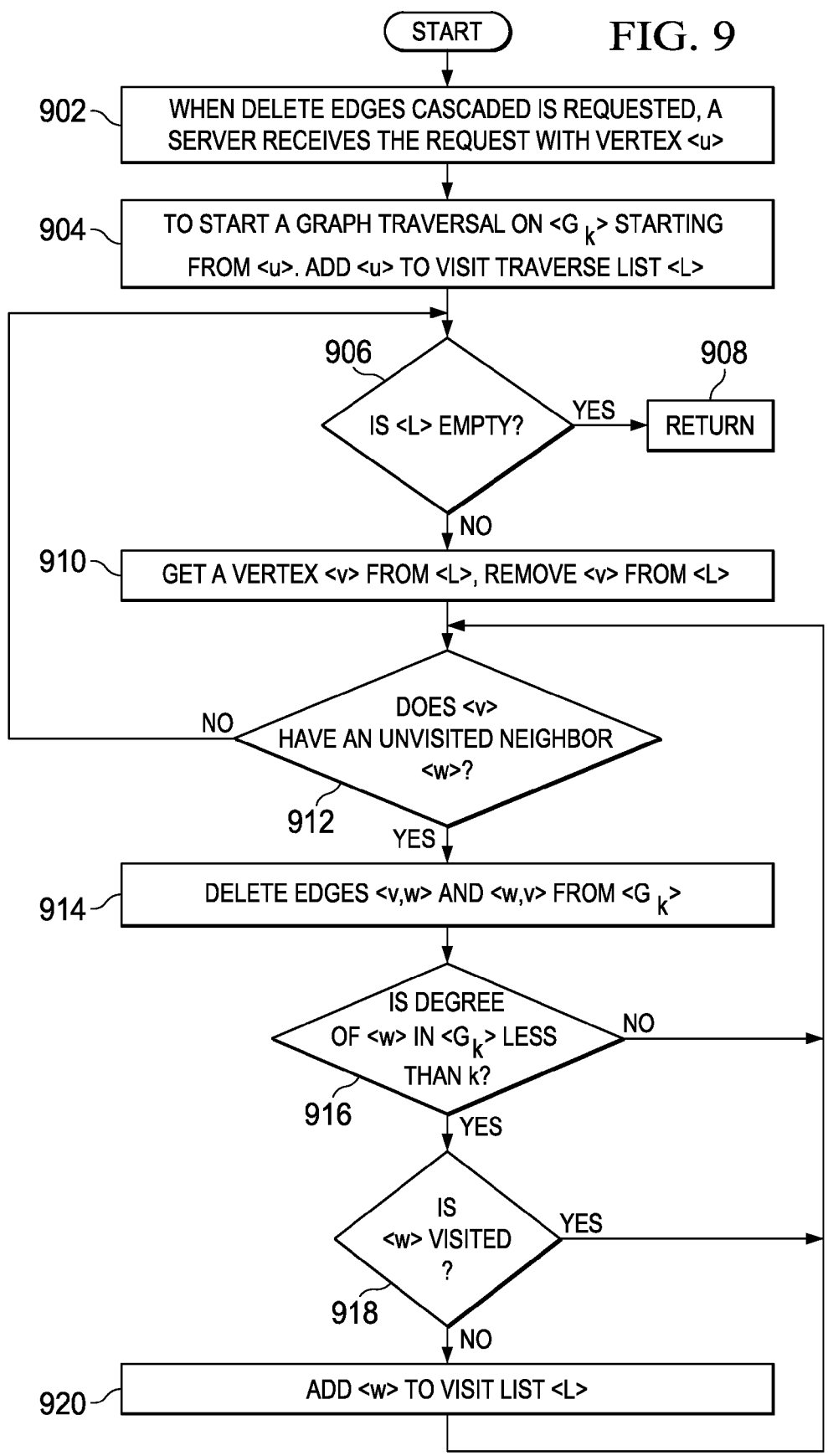
FIG. 9 illustrates a procedure which may be used in the procedure of FIG. 8 to delete edges in cascaded fashion after a single edge deletion.

Referring to FIG. 9, there are shown steps of a procedure comprising the Delete Edges Cascaded algorithm. As described above in connection with FIG. 8, this algorithm is applied to the vertices u and v of a deleted edge (u,v), after determining that the edge was deleted from the k-core subgraph $G_k$, and the degree of both vertices u and v have become less than k. The Delete Edges Cascaded procedure traverses the k-core subgraph $G_k$ from a start vertex, to ensure that all neighbors reachable from the start vertex each has at least k neighbors.

The procedure commences at step 902, when the server of the distributed processing system receives a Delete Edges Cascaded request. The request includes a vertex u, as the start vertex. In response to the request, vertex u is added to a traverse list L at step 904, which is a list of vertices of k-core subgraph $G_k$ that are to be traversed as a result of an edge deletion.

At decision step 906 traverse list L is checked to see whether or not it is empty. If it is, the procedure ends and is returned at step 908. However, if the list is not empty, the next vertex v on the traverse list L is acquired, and then removed from the list, at step 910. For the procedure of FIG. 9, vertex v is a neighbor of start vertex u. All neighbors of vertex v will be traversed. Accordingly, at decision step 912 the server determines whether vertex v has any neighbor w that is unvisited, that is, has not yet been considered by the procedure of FIG. 9. If not, the server moves to step 906, to process the next vertex, and otherwise goes to step 914.

The procedure of FIG. 8 determined that the degree of destination vertex v, of the deleted edge (u,v), had become less than k. Accordingly, it is necessary to delete the edge (v,w), and also the edge the (w,v), from k-core subgraph $G_k$. This is implemented at step 914. Then, at decision step 916 the server determines whether the degree of w in subgraph $G_k$ is less than k, after the deletion at step 914. If not, the server moves to step 912 to process the next edge of vertex v. However, if the result at decision step 916 is affirmative, the server checks at step 918 to determine whether vertex w has already been visited. If so, the server moves to step 912 to process the next edge of vertex v. If not, vertex w is added the to traverse list L at step 920. The server then moves to step 912 to process the next edge.

The Delete Edges Cascaded request returns at step 908, when all vertices that are reachable from start vertex u each as at least k neighbors. As shown by FIG. 8, the Delete Edges Cascaded procedure of FIG. 9 is also carried out for starting vertex v, where v is the destination vertex of the deleted edge (u,v).

Figure 10:
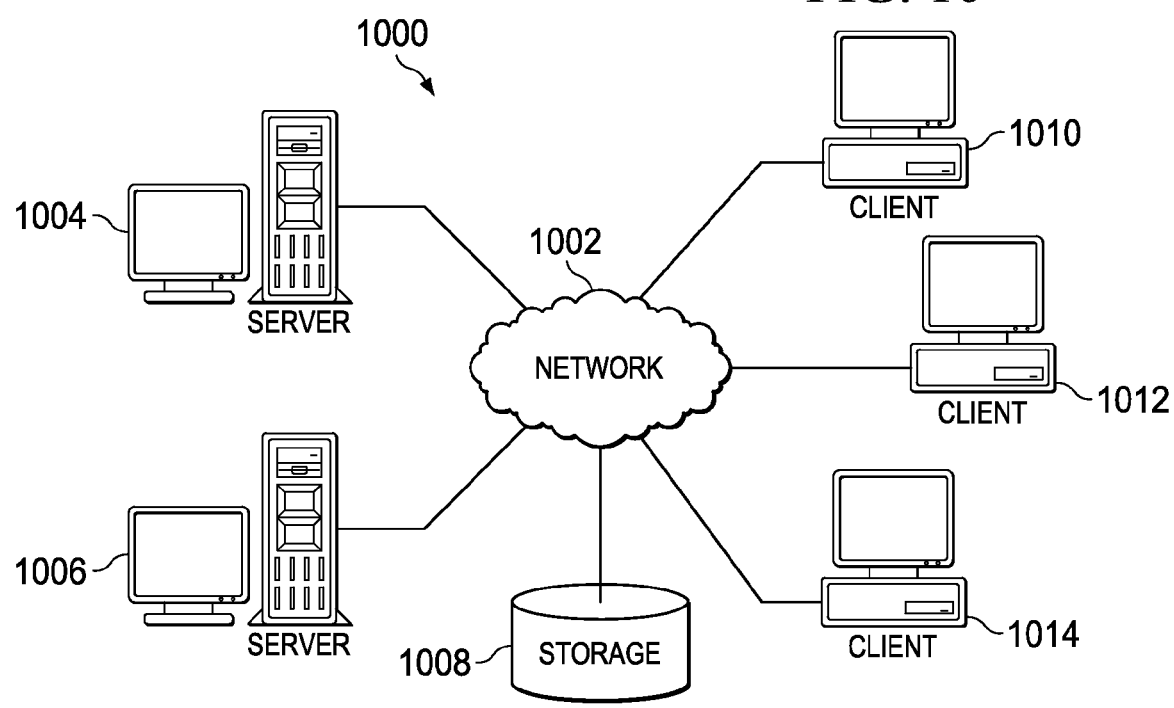
FIG. 10 is a block diagram showing a network of data processing systems in which an embodiment of the invention may be implemented.

FIG. 10 is a pictorial representation of a network of data processing systems in which illustrative embodiments of the invention may be implemented. Network data processing system 1000 is a network of computers in which the illustrative embodiments may be implemented. Network data processing system 1000 contains network 1002, which is the medium used to provide communications links between various devices and computers connected together within network data processing system 1000. Network 1002 may include connections, such as wire, wireless communication links, or fiber optic cables.

In the depicted example, server computer 1004 and server computer 1006 connect to network 1002 along with storage unit 1008. In addition, client computers 1010, 1012, and 1014 connect to network 1002. Client computers 1010, 1012, and 1014 may be, for example, personal computers or network computers. In the depicted example, server computer 1004 provides information, such as boot files, operating system images, and applications to client computers 1010, 1012, and 1014. Client computers 1010, 1012, and 1014 are clients to server computer 1004 in this example. Network data processing system 1000 may include additional server computers, client computers, and other devices not shown.

Program code located in network data processing system 1000 may be stored on a computer-recordable storage medium and downloaded to a data processing system or other device for use. For example, program code may be stored on a computer-recordable storage medium on server computer 1004 and downloaded to client computer 1010 over network 1002 for use on client computer 1010.

In the depicted example, network data processing system 1000 is the Internet with network 1002 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 1000 also may be implemented as a number of different types of networks, such as, for example, an intranet, a local area network (LAN), or a wide area network (WAN). FIG. 10 is intended as an example, and not as an architectural limitation for the different illustrative embodiments.

Figure 11:
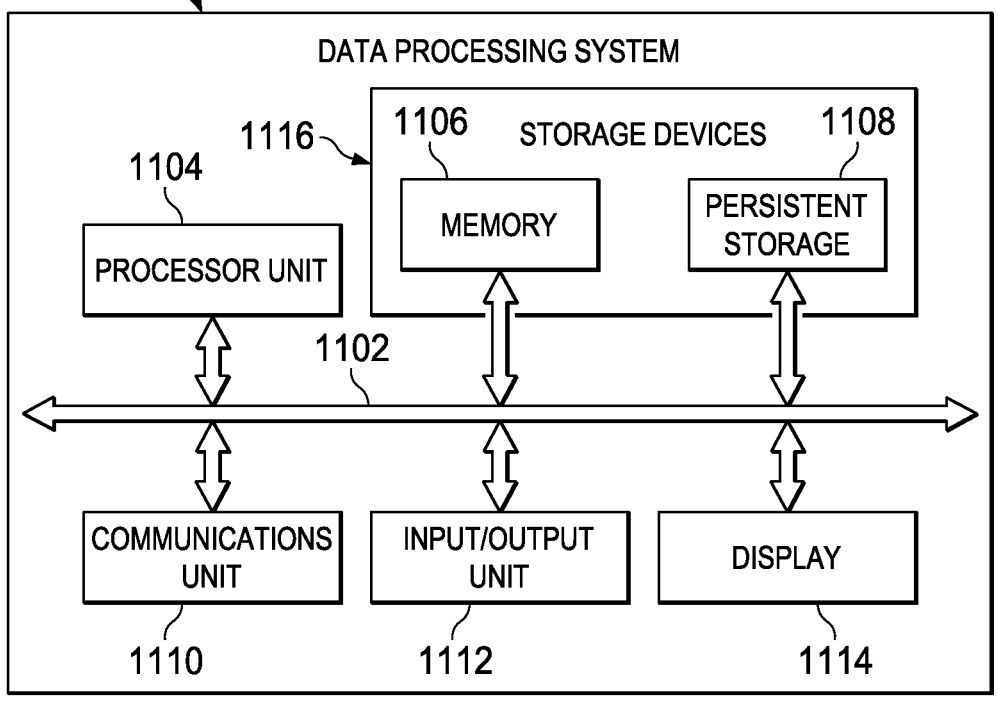
FIG. 11 is a block diagram showing a computer or other data processing system that may be used in implementing embodiments of the inventions.
Figure 11:
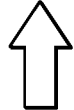
Figure 11:
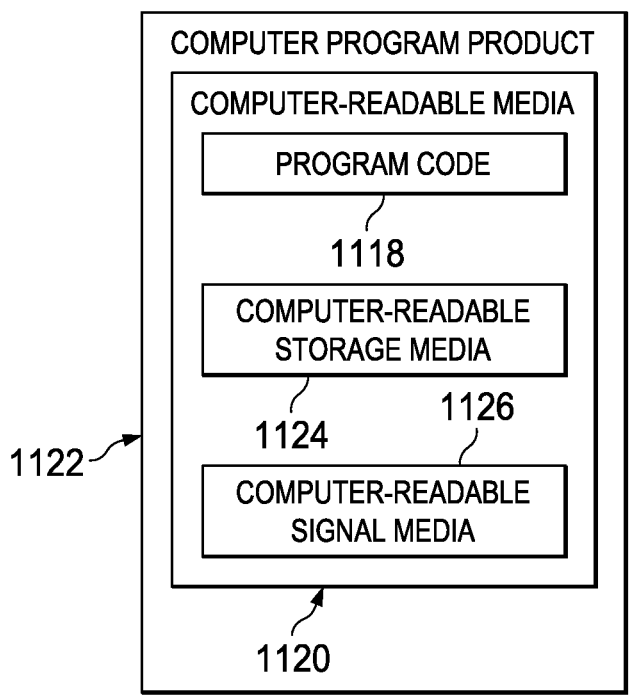

Turning now to FIG. 11, an illustration of a data processing system is depicted in accordance with an illustrative embodiment. In this illustrative example, data processing system 1100 includes communications fabric 1102, which provides communications between processor unit 1104, memory 1106, persistent storage 1108, communications unit 1110, input/output (I/O) unit 1112, and display 1114.

Processor unit 1104 serves to process instructions for software that may be loaded into memory 1106. Processor unit 1104 may be a number of processors, a multi-processor core, or some other type of processor, depending on the particular implementation. "A number," as used herein with reference to an item, means one or more items. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code in functional form, and/or other suitable information either on a temporary basis and/or a permanent basis. Storage devices 1116 may also be referred to as computer readable storage devices in these examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output unit 1112 allows for input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications fabric 1102. In these illustrative examples, the instructions are in a functional form on persistent storage 1108. These instructions may be loaded into memory 1106 for processing by processor unit 1104. The processes of the different embodiments may be performed by processor unit 1104 using computer-implemented instructions, which may be located in a memory, such as memory 1106.

These instructions are referred to as program code, computer usable program code, or computer readable program code that may be read and processed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for processing by processor unit 1104. Program code 1118 and computer readable media 1120 form computer program product 1122 in these examples. In one example, computer readable media 1120 may be computer readable storage media 1124 or computer readable signal media 1126.

Computer readable storage media 1124 may include, for example, an optical or magnetic disk that is inserted or placed into a drive or other device that is part of persistent storage 1108 for transfer onto a storage device, such as a hard drive, that is part of persistent storage 1108. Computer readable storage media 1124 also may take the form of a persistent storage, such as a hard drive, a thumb drive, or a flash memory, that is connected to data processing system 1100.

In some instances, computer readable storage media 1124 may not be removable from data processing system 1100. In these examples, computer readable storage media 1124 is a physical or tangible storage device used to store program code 1118 rather than a medium that propagates or transmits program code 1118. Computer readable storage media 1124 is also referred to as a computer readable tangible storage device or a computer readable physical storage device. In other words, computer readable storage media 1124 is media that can be touched by a person.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1118 may be downloaded over a network to persistent storage 1108 from another device or data processing system through computer readable signal media 1126 for use within data processing system 1100. For instance, program code stored in a computer readable storage medium in a server data processing system may be downloaded over a network from the server to data processing system 1100. The data processing system providing program code 1118 may be a server computer, a client computer, a remote data processing system, or some other device capable of storing and transmitting program code 1118. For example, program code stored in the computer readable storage medium in data processing system 1100 may be downloaded over a network from the remote data processing system to the computer readable storage medium in data processing system 1100. Additionally, program code stored in the computer readable storage medium in the server computer may be downloaded over the network from the server computer to a computer readable storage medium in the remote data processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method associated with specified graph data comprising vertices and edges that each extends between two vertices, wherein the method comprises the steps of iteratively:
    selecting each vertex from the specified graph data that has a degree which is equal to or greater than a given value k, wherein the specified graph data is partitioned into multiple partitioned data sets, and wherein each partitioned data set is stored for use with a corresponding one of multiple servers;
    determining whether a qualifying neighbor count (QNC) of each selected vertex is equal to or greater than k;
    deleting each edge incident at a vertex that has a QNC which is not equal to or greater than k;
    terminating the iterations when no more edges are deleted; and
    designating remaining, undeleted graph data as a k-core subgraph.

2. The method of claim 1, wherein:
    the qualifying neighbor count (QNC) is computed with a lookup table in which all the vertices with degree greater or equal to k are listed.

3. The method of claim 2, wherein:
    a QNC lookup table is updated when edges incident to vertices are deleted between iterations.

4. The method of claim 1, wherein:
    responsive to a graph change event, servers selectively process data of their respective partitioned data sets, in order to determine whether the change event requires modification of the k-core subgraph.

5. A computer implemented method associated with specified graph data comprising vertices and edges that each extends between two vertices, wherein the method comprises the steps of:
    generating a particular k-core subgraph from the specified graph data, wherein the particular k-core subgraph has a given value k;
    responsive to a graph change event, which comprises insertion of an edge having a vertex u and a vertex v into the specified graph data, using data pertaining to the particular k-core subgraph to determine whether the graph change event requires modification of the particular k-core subgraph;

calculating a degree and qualifying neighbor count (QNC) of vertices u and v, and updating an auxiliary information table with the respective u and v calculations;

calculating the degree and QNC of each neighboring vertex of both vertices u and v, and updating the auxiliary information table with the neighboring vertex calculations;

terminating the method if both vertices u and v are already part of the particular k-core subgraph; and terminating the method if both vertices u and v are not part of the particular k-core subgraph, and they each have a QNC that is less than k.

6. The method of claim 5, wherein:
vertices are identified for a candidate subgraph, by traversing from vertex u or vertex v, selectively, in order to identify vertices of a region that are reachable from vertex u or vertex v, wherein each vertex of the region is not in the particular k-core subgraph, and has a QNC that is not less than k.

7. The method of claim 6, wherein:
a qualifying algorithm is applied to respective identified vertices of candidate subgraphs, to determine if each identified vertex is qualified to be included in the particular k-core subgraph.

8. The method of claim 7, wherein:
determining if a given identified vertex is qualified includes determining whether the degree of the given identified vertex is greater than or equal to k.

9. The method of claim 5, wherein the graph change event comprises deletion of the edge having a vertex u and a vertex v from the specified graph data, and the method further comprises:
calculating the degree and QNC of vertices u and v, and updating the auxiliary information table with the respective u and v calculations;
calculating the degree and QNC of each neighboring vertex of both vertices u and v, and updating the auxiliary information table with the neighboring vertex calculations;
terminating the method if both vertices u and v are not part of the particular k-core subgraph; and
traversing from either vertex u or v, selectively, to identify vertices of a region reachable from vertex u or vertex v, wherein each identified vertex in the region was in the particular k-core subgraph previously, but has a QNC less than k after the deletion of the edge.

10. The method of claim 9, wherein:
the method terminates when each identified vertex, which is a neighbor of another vertex that is also a neighbor of vertex u or vertex v, has a degree of at least k.

11. The method of claim 5, wherein:
the specified graph data comprises large scale graph data.

12. A computer program product associated with specified graph data comprising vertices and edges that each extends between two vertices, the computer program product comprising a non-transitory computer readable storage medium having instructions embodied therewith, the instructions comprise:
instructions for iteratively selecting each vertex from the specified graph data that has a degree which is equal to or greater than a given value k, wherein the specified graph data is partitioned into multiple partitioned data sets, and wherein each partitioned data set is stored for use with a corresponding one of multiple servers;
instructions for determining whether a qualifying neighbor count (QNC) of each selected vertex is equal to or greater than k;
instructions for deleting each edge incident at a vertex that has a QNC which is not equal to or greater than k;
instructions for terminating the iterations when no more edges are deleted; and
instructions for designating remaining undeleted graph data as a particular k-core subgraph.

13. The computer program product of claim 12, wherein:
the qualifying neighbor count (QNC) is computed with a lookup table in which all the vertices with degree greater or equal to k are listed.

14. The computer program product of claim 13, wherein:
an QNC lookup table is updated when edges incident to vertices are deleted between iterations.

15. The computer program product of claim 12, wherein the instructions further comprise:
instructions responsive to a graph change event, which comprises a particular edge being either inserted into or deleted from the specified graph data, selectively, for using data pertaining to the k-core subgraph to determine whether the change event requires modification of the particular k-core subgraph.

16. The computer program product of claim 15, wherein the graph change event comprises insertion of an edge having a vertex u and a vertex v into the specified graph data, and wherein the instructions further comprise:
instructions for calculating the degree and QNC of vertices u and v, and updating an auxiliary information table with the respective u and v calculations;
instructions for calculating the degree and QNC of each neighboring vertex of both vertices u and v, and updating the auxiliary information table with the neighboring vertex calculations;
instructions for terminating the process if both vertices u and v are already part of the particular k-core subgraph; and
instructions for terminating the process if both vertices u and v are not part of the particular k-core subgraph, and they each have a QNC that is less than k.

17. The computer program product of claim 15, wherein the graph change event comprises deletion of an edge having a vertex u and a vertex v from the specified graph data, and wherein the instructions further comprise:
instructions for calculating the degree and QNC of vertices u and v, and updating an auxiliary information table with the respective u and v calculations;
instructions for calculating the degree and QNC of each neighboring vertex of both vertices u and v, and updating the auxiliary information table with the neighboring vertex calculations;
instructions for terminating the process if both vertices u and v are not part of the particular k-core subgraph; and
instructions for traversing from either vertex u or v, selectively, to identify vertices of a region reachable from vertex u or vertex v, wherein each identified vertices in the region was in the particular k-core subgraph previously, but has a QNC less than k after the edge deletion.

* * * * *